UNITED STATES PATENT OFFICE.

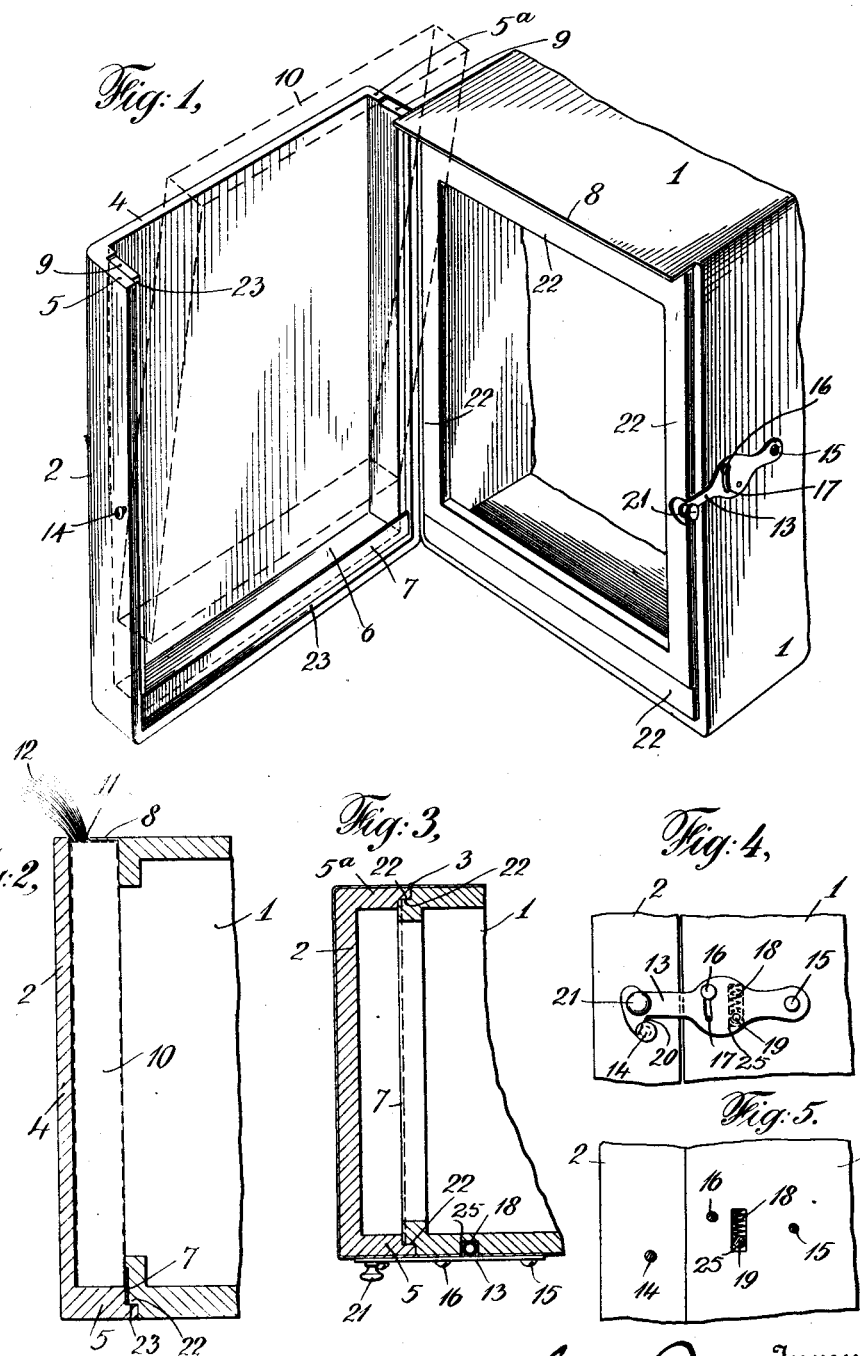

CARL BORNMANN, OF BINGHAMTON, NEW YORK, ASSIGNOR TO ANSCO COMPANY, OF BINGHAMTON, NEW YORK.

FILM-PACK PHOTOGRAPHIC APPARATUS.

1,034,865.  Specification of Letters Patent.  Patented Aug. 6, 1912.

Application filed December 12, 1911. Serial No. 665,202.

*To all whom it may concern:*

Be it known that I, CARL BORNMANN, a citizen of the United States, and a resident of the city of Binghamton, county of Broome, State of New York, have invented certain new and useful Improvements in Film-Pack Photographic Apparatus, of which the following is a full, clear, and exact description.

It is the purpose of this invention to provide means whereby film packs may be more easily introduced into cameras or pack holders and be there held securely and protected against the action of light. The construction is such also that a ground glass may be conveniently used for determining the focus of the camera.

In the drawings hereof I illustrate the invention as applied to the rear of a camera. It will be readily understood that the same construction may be applied to a pack holder, since the front of the holder may be practically the same as the rear of the camera.

Figure 1 illustrates an elevation in perspective of the invention, showing the film pack in dotted lines in the act of being introduced; Fig. 2 illustrates a vertical sectional view of the invention, the rear of the camera or holder being closed, the film pack being in position; Fig. 3 illustrates a horizontal sectional view of that which is shown in Fig. 2; Fig. 4 illustrates an elevation of the confining latch for the pack holding part of the apparatus; and Fig. 5 illustrates a view the same as Fig. 4, the latch being removed and the pins and springs which co-act with it shown in section.

1 represents part of a camera box. In the instance shown it is an ordinary box camera.

2 represents the rear part of the camera or the rear part of the pack holder, as the case may be. It is hinged to the part 1 as at 3 (see Fig. 3). I prefer that this hinge shall be made of leather or imitation leather, the same as that with which the camera is covered. It may, however, be of any other preferred material and construction and in heavy cameras it will sometimes be desirable to reinforce the leather or imitation leather with additional strong fibrous material, or with metallic devices of suitable kind, as is well understood in this art.

The rear or swinging part of the camera is composed of a back piece 4 and two side pieces 5 and 5ª, and a bottom piece 6, so that these parts taken together constitute a recessed swinging structure adapted to receive the film pack, as hereinafter explained.

A metallic plate 7 is located at the bottom of the swinging part. It is arranged vertically and extends clear across near the front edges of the side pieces 5 and 5ª. 8 is a similar plate arranged horizontally. It is preferably of metal, although it may be of any other suitable material, and it extends rearwardly from the upper side of the camera proper and its ends enter into recesses 9, 9, made at the upper edges of the side pieces 5 and 5ª respectively of the swinging rear part, so that when that part is closed against the body part of the camera, this projecting plate 8 will partly reduce the opening at the upper end of the swinging part as illustrated clearly in Fig. 2, because of its overlapping the film pack 10 which is shown in position in that figure. Sufficient space 11 is left, however, through which the manipulating tabs 12 of the film pack may project, as shown also in Fig. 2. The horizontally projecting plate 8 on the body part of the camera and the vertically arranged plate 7 on the swinging rear part perform important functions, among them the following: The rear of the camera being swung open, as shown in Fig. 1, the pack, shown diagrammatically in that figure, may be readily introduced therein by resting its rear edge against the backboard of the swinging part and gently pressing it down until its lower edge shall pass behind the vertical plate 7, as shown in Fig. 2. Then the upper edge of the pack may readily be pressed backwardly, so that it will entirely pass within the recess in the rear swinging part, the tabs 12 naturally assuming the position shown in Fig. 2. The swinging rear part will then be closed against the body part of the camera, as shown in Fig. 3, whereupon the latch 13 (see Fig. 4) will engage with a pin 14 on the swinging rear part which will be held by the latch firmly against the rear of the camera; and in order that this action may be reliable and the parts permanently held in this closed position, I make the latch of peculiar construction, as shown in Figs. 4 and 5. The general outline of the latch is shown in Fig. 4. It is pivoted at 15 to the body part. 16 is a pin which works through a slot 17 in the latch, guiding and holding it, and a spring 18 which is inclosed in a recess 25 made in the body part, as shown, engages with a pin 19 on the latch, so that the latter is normally held at all times pressed downwardly into good holding engagement with the pin.

In order that the pressure exerted by the latch upon the pin 14 may tend always to draw and to hold the swinging back snugly against the rear of the camera box proper, I prefer to make the end of the latch inclined, as shown at 20, so that it will exert a cam like or crowding action against the pin 14, insuring the light-tight closure of the swinging rear part against the body part of the camera. 21 is a knob on the front end of the latch for its more convenient manipulation.

In order that the joint between the swinging rear part and the body part of the camera may be light-tight I provide suitable rabbeted surfaces, shown best at 22, 22, in Fig. 3, which enter corresponding recesses 23 in the swinging rear part.

I call particular attention to the following series of advantages secured by this new construction.

(a). The film pack is introduced from the front of the swinging rear part of the camera and this for several reasons is a more desirable way in which to introduce it than any heretofore known to me.

(b). The construction is such that the proper registration of the film pack with the focal plane, its proper retention in that requisite position, the impossibility of removing it from the swinging holder when it is closed and latched to the camera body because of the horizontal plate 8 and the vertical plate 7 and the secure closure of the camera and protection against the entrance of white light, are all automatically secured by the structural features of the parts, so that the operator need not be watchful, nor called upon to perform any other act than the mere insertion of the pack and the closing of the swinging rear part against the body part of the camera, because if these simple acts which are obviously to be performed are attended to, then all else follows automatically.

(c). When the swinging part is swung open a ground glass may be placed against the rear side of the rabbets on the camera box proper, which coincide with the focal plane, (see Fig. 2) and thereupon, particularly if a tripod is used, the camera may be focused in a well known manner.

(d). Easy access is afforded to the inside of the camera for repair, cleansing, etc. This is an important feature because it frequently avoids the necessity for taking the apparatus apart more or less.

(e). The spring actuated latch serves an important purpose because it assures the permanent light tightness of the camera, compensating for atmospheric changes and jars or shocks to which the camera might be subjected. It frequently happens that a camera will be laid aside for an indefinite time after use in humid weather or under such conditions that the woodwork has swollen more or less, but sufficiently to permit the entrance of white light which may result in the fogging of a plate, when the camera shall again become dry and the parts shrink, thus opening cracks for the admission of such light; but this cannot happen in the described construction because the spring 18 is made of sufficient stiffness to cause the cam shaped or inclined surface 20 on the end of the latch which engages with the pin 14 on the swinging rear part of the camera to automatically draw the swinging part against the rear of the camera proper and hold it there, thus closing all cracks, if any are formed, and efficiently preventing the entrance of light.

It will be obvious to those who are familiar with this art that many modifications may be made in the details of construction and yet the essentials of the invention be employed. I therefore do not limit myself to the details as illustrated and described.

I claim:

1. In a structure of the class stated, a body part, a recessed rear part adapted to receive a film pack and hinged to the body part, means on the recessed rear part for the confinement of the lower end of the pack, other means attached to the camera for the confinement of the upper end of the pack and means to hold the hinged rear part to the body part when closed.

2. In a structure of the class stated, a body part, a recessed rear part adapted to receive a film pack and hinged to the body part, a vertically arranged plate on the hinged part adapted to confine the lower end of the pack, a horizontally arranged plate on the body part adapted to overlap and thus confine the upper end of the pack and means to hold the hinged rear part to the body part when closed.

3. In a structure of the class stated, a body part, a recessed rear part adapted to receive a film pack and hinged to the body part, a vertically arranged plate on the hinged part adapted to confine the lower end of the pack, a horizontally arranged plate on the body part adapted to overlap and thus confine the upper end of the pack and a spring actuated latch adapted to draw and hold the hinged rear part to the body part when closed.

4. In a structure of the class stated, a body part, a recessed rear part adapted to receive a film pack and hinged to the body part, means on the hinged part for the confinement of the lower end of the pack, means on the body part for the confinement of the upper end of the pack and means to hold the hinged rear part to the body part when closed.

In testimony whereof I have signed my name to this specification in the presence of two subscribing witnesses.

CARL BORNMANN.

Witnesses:
 GEO. W. TOPLIFF,
 A. DEICHELMANN.